United States Patent [19]
Schroeder

[11] Patent Number: 6,107,943
[45] Date of Patent: Aug. 22, 2000

[54] DISPLAY SYMBOLOGY INDICATING AIRCRAFT GROUND MOTION DECELERATION

[75] Inventor: Jeffrey R. Schroeder, Lake Oswego, Oreg.

[73] Assignee: Rockwell Collins, Inc., Cedar Rapids, Iowa

[21] Appl. No.: 09/293,595

[22] Filed: Apr. 16, 1999

[51] Int. Cl.[7] .................................................. G08B 21/00
[52] U.S. Cl. ..................... 340/945; 340/973; 340/980; 73/178 T
[58] Field of Search ................................. 340/945, 959, 340/963, 969, 973, 980; 345/7; 359/630; 701/15, 16; 73/178 T

[56] References Cited

U.S. PATENT DOCUMENTS

| | | | |
|---|---|---|---|
| 3,920,204 | 11/1975 | Bissell et al. | 73/178 T |
| 4,122,522 | 10/1978 | Smith | 73/178 T |
| 4,419,079 | 12/1983 | Georges et al. | 340/973 |
| 5,047,942 | 9/1991 | Middleton et al. | 73/178 T |
| 5,289,185 | 2/1994 | Ramier et al. | 340/973 |
| 5,353,022 | 10/1994 | Middleton et al. | 73/178 T |
| 5,675,328 | 10/1997 | Coirier et al. | 340/980 |
| 5,797,562 | 8/1998 | Wyatt | 340/973 |

*Primary Examiner*—Brent A. Swarthout
*Assistant Examiner*—John Tweel, Jr.
*Attorney, Agent, or Firm*—Nathan O. Jensen; Kyle Eppele; J. P. O'Shaughnessy

[57] ABSTRACT

Aircraft display symbology provides quantitative deceleration information in relation to a pilot familiar reference on a HUD system combiner. The symbology displayed includes a deceleration scale composed of a series of marks that provide a known reference for the display of deceleration information. The number of marks on the scale and the positioning and labeling of the marks can be tailored for a particular aircraft type. In a preferred embodiment, the deceleration scale is displayed along and proximal to the vertical path traveled by an aircraft acceleration symbol, which indicates the actual longitudinal acceleration or deceleration of the aircraft. The offset distance of the aircraft acceleration symbol below an aircraft reference or "boresight" symbol shows the actual (inertial) deceleration during landing rollout and rejected takeoff. The position of the aircraft acceleration symbol relative to the deceleration scale marks thereby shows the actual deceleration with respect to the reference provided by the scale. The deceleration scale is preferably displayed only when it is intended to be used—during landing rollout and during a rejected takeoff.

9 Claims, 3 Drawing Sheets

DISPLAY SYMBOLOGY INDICATING AIRCRAFT GROUND MOTION DECELERATION

TECHNICAL FIELD

The present invention relates to the visual display of aircraft flight information for observation by a pilot and, in particular, to the production and display of symbology for informing the pilot of the actual deceleration of the aircraft as it moves on the ground during landing rollout or a rejected takeoff.

BACKGROUND OF THE INVENTION

Head-up display (HUD) systems are currently used in aircraft to provide pilots with essential information superimposed onto their forward field of view through the aircraft windshield. The information displayed is typically data or symbolic images indicative of flight conditions, such as the operating condition of the aircraft, environmental information, or guidance information. HUD systems are also being designed for use in automobiles and other vehicles.

In one type of aircraft HUD system, a light source emits a colored image carried by multiple wavelengths of light in response to signals generated by an image signal controller. The light rays carrying the colored image propagate through a relay lens to create an intermediate image. A wavelength selective combiner reflects the intermediate image toward a pilot, who views the image as it is superimposed on an outside world scene in the same field of view. The combiner is constructed to have multiple optical powers that correct for longitudinal color aberrations introduced by monochromatic relay lens elements and thereby presents to the pilot a correctly focused multi-colored final virtual image at or near optical infinity. The design details of a multi-color HUD system are described in U.S. Pat. No. 5,710,668, which is assigned to the assignee of this patent application.

Guidance information displayed on a HUD combiner for observation by a pilot frequently includes symbology that represents position and attitude guidance for the aircraft during flight. One example is a flare anticipation cue implemented in a Flight Dynamics Head-Up Guidance System (HGS) that is certified by the Federal Aviation Administration for use on Boeing 737-300 aircraft. The flare anticipation cue alerts the pilot several seconds before the aircraft reaches a flare initiation height and indicates to the pilot the pitch up rate required at the initial part of the flare. Another example is a turn anticipation cue that is described in co-pending International Patent Application No. PCT/US98/14177, which is assigned to the assignee of this application. The turn anticipation cue provides guidance information to a pilot during low visibility ground weather conditions after the aircraft has touched down so that the pilot can safely taxi the aircraft to the airport terminal.

Most current aircraft cockpit displays of basic flight information provide no indication of the acceleration or deceleration of the aircraft. The above-noted HGS provides such an indication in a gross qualitative format, informing the pilot only that the aircraft is decelerating a little or a lot as it moves on the ground. There is provided no reference that allows quick-glance interpretation of the deceleration with respect to any reference familiar to the pilot. The lack of a direct indication of deceleration with respect to a known reference makes it difficult for the pilot to determine the actual deceleration of the airplane (as opposed to commanded or expected deceleration) during aircraft landing rollout or rejected takeoff (RTO). Whenever the actual deceleration is less than the nominal or expected deceleration, caused, for example, by wet or icy runway surface conditions, a consequence can be delayed pilot recognition of inadequate deceleration. This can lead during aircraft rollout to delayed action in establishing the necessary deceleration to stop the aircraft on the remaining runway surface or during landing to delayed recognition of a need to initiate a go-around maneuver. In either situation, without good indication of the actual deceleration, the chances of a runway excursion are increased.

It would be desirable, therefore, to provide for display to a pilot a quantitative indication of the deceleration of the aircraft during landing rollout or rejected takeoff.

SUMMARY OF THE INVENTION

An object of the invention is, therefore, to provide to a pilot visual quantitative indication of aircraft deceleration during landing rollout or rejected takeoff.

An advantage of the invention is that it can be implemented with the use of symbolic images displayed on a HUD system combiner.

The present invention is described by way of example with reference to aircraft head-up display systems and solves the problem of displaying to a pilot quantitative indication of deceleration of an aircraft as it moves on a runway surface. The present invention is the production of symbology for display as quantitative deceleration information in relation to a pilot familiar reference on a HUD system combiner.

The symbology displayed includes a deceleration scale composed of a series of marks that provide a known reference for the display of deceleration information. The number of marks on the scale and the positioning and labeling of the marks can be tailored for a particular aircraft type. In a preferred embodiment, the deceleration scale is displayed along and proximal to the vertical path traveled by an aircraft acceleration symbol, which indicates the actual longitudinal acceleration or deceleration of the aircraft. The offset distance of the aircraft acceleration symbol below an aircraft reference or "boresight" symbol shows the actual (inertial) deceleration during landing rollout and rejected takeoff. The position of the aircraft acceleration symbol relative to the deceleration scale marks thereby shows the actual deceleration with respect to the reference provided by the scale. Each scale mark is formed of horizontal line that marks the exact position of the reference deceleration level and an attached vertical line that increases the size of the mark and provides a small range indication to prevent pilot fixation on the aircraft acceleration position with respect to the horizontal line. The deceleration scale is preferably displayed only when it is intended to be used—during landing rollout and during a rejected takeoff.

Additional objects and advantages of this invention will be apparent from the following detailed description of a preferred embodiment thereof which proceeds with reference to the accompanying drawings.

DETAILED DESCRIPTION OF A PREFERRED EMBODIMENT

Figure 1:
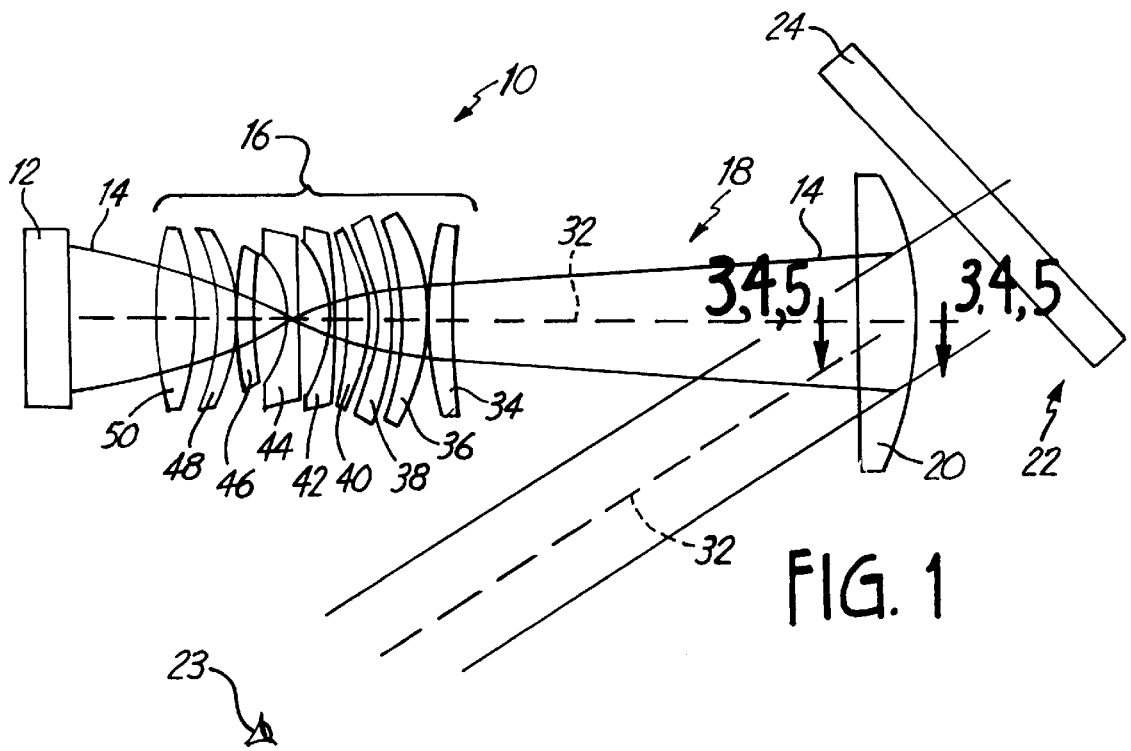
FIG. 1 is a diagram of an aircraft head-up display system that includes an optical combiner on which the aircraft deceleration indication symbology of the present invention is displayed.
Figure 2:
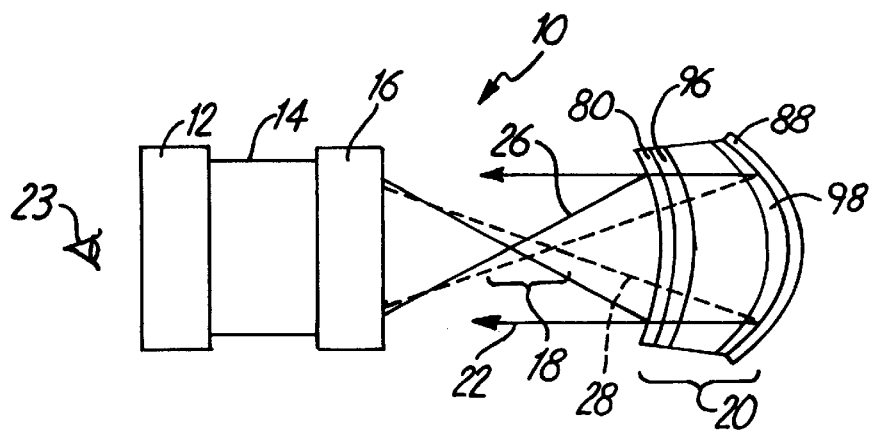
FIG. 2 is plan view of the display system of FIG. 1 with the relay lens shown in schematic diagram form and the combiner shown in enlarged detail.

FIGS. 1 and 2 show a multi-color optical head-up display ("HUD") system 10 in which the present invention is preferably implemented and which is preferably installed in an aircraft. System 10 includes an image source 12 that produces a multi-colored image carried by light rays 14 that propagate through a monochromatic relay lens 16 to create an intermediate image 18. Image 18 is carried by light rays 14 that are reflected by a collimating combiner 20 to create a final image 22 (FIG. 1) that is viewed at the pilot's eye reference point 23. Combiner 20 superimposes final virtual image 22 at or near optical infinity on an outside world scene (not shown) that the pilot sees through a windshield 24.

Image source 12 is preferably a cathode-ray tube that emits a multi-colored image that includes a green component 26 carried by multiple wavelengths of light in the range of about 540–560 nanometers (nm) and a red component 28 carried by multiple wavelengths of lights in the range of about 610–640 nm. (In other embodiments not shown, multi-colored image 14 could include a third, e.g., blue, component carried by multiple wavelengths of light in the range of about 470–500 nm.) Other colors of light may also be used. Image source 12 emits the color components of multi-colored image 14 in a conventional field sequential manner so that the color components are laterally color corrected as they propagate generally along a light path 32 (indicated by dash lines) toward relay lens 16.

Relay lens 16 transfers the image produced by image source 12 to combiner 20. Relay lens 16 preferably is a conventional monochromatic lens array configured to transfer a single color of light having a range of wavelengths centered at about 544 nm (i.e., green light) that is typically produced by a cathode-ray tube constructed with a P43 phosphor.

Monochromatic lens 16 includes between five and twelve, and typically nine, optical lens elements that cooperate to form a focused, single-color intermediate image. Lens elements 34, 36, 38, 40, 42, 44, 46, 48, and 50 each have specially configured curved surfaces and thicknesses that cooperate to bend the single-colored light as it propagates through relay lens 16. The radii of the curved surfaces and the thicknesses of the lens elements can be determined by a person sufficiently skilled to use a commercially available ray trace program such as the Code V or Oslo Six software analysis and design program. The multiple colors of light carried by green light rays 26 and red light rays 28 emitted by light source 12 propagate through monochromatic relay lens 16 and are bent along different light paths so that intermediate image 18 can be described as being unfocused and having longitudinal color aberrations.

Intermediate image 18 is reflected and refracted by collimating combiner 20 to create final virtual image 22 (FIG. 1) that has an image point approximately at infinity for each wavelength of light that the pilot views from eye reference point 23. To correct the longitudinal color aberrations of intermediate image 18, combiner 20 includes multiple substrates 80 and 88 and multiple wavelength selective reflective coatings 96 and 98, as described in U.S. Pat. No. 5,710,668.

Figure 3:
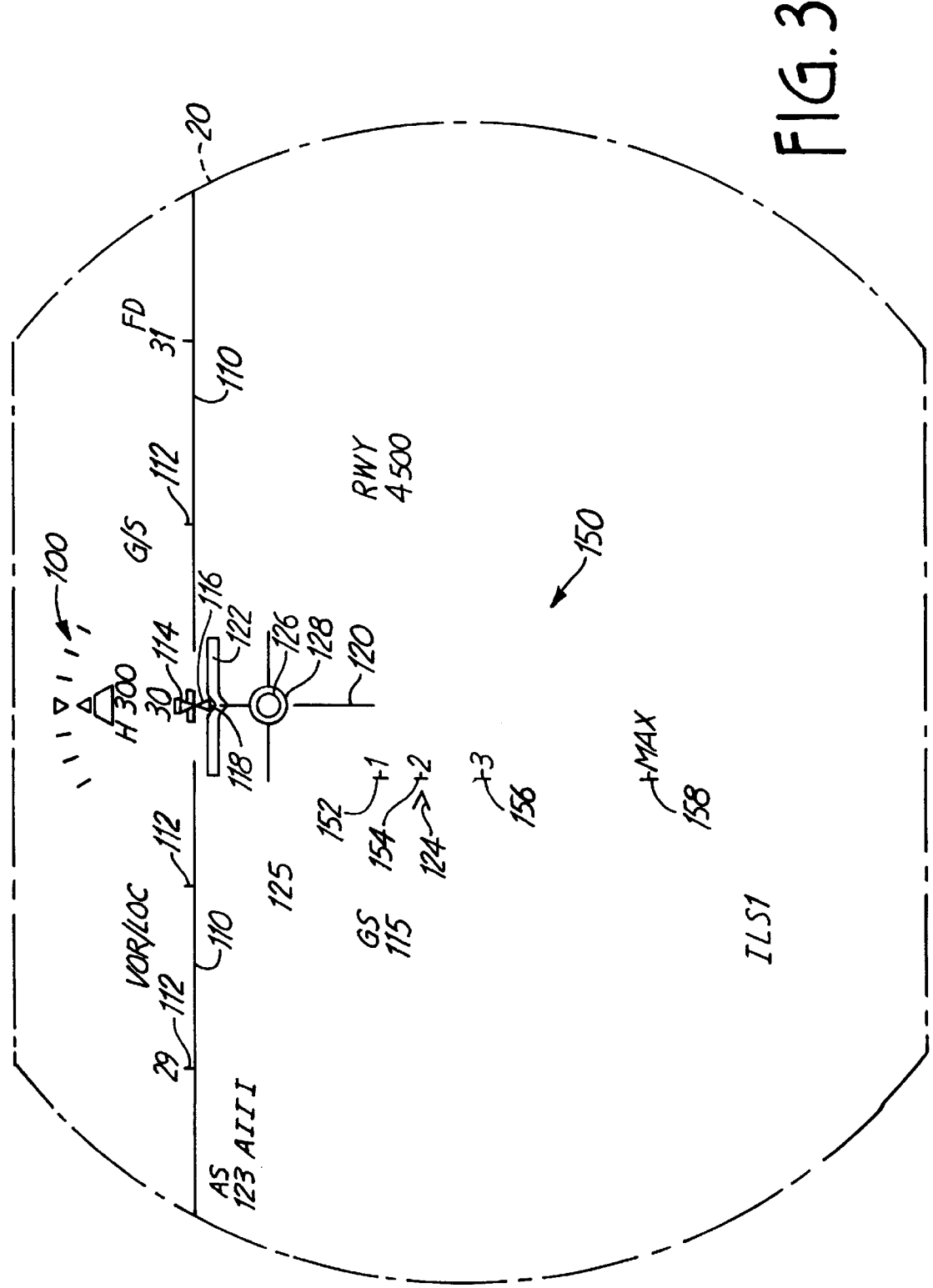
FIG. 3 shows an example of a scene a pilot views on a HUD combiner during landing rollout.
Figure 4:
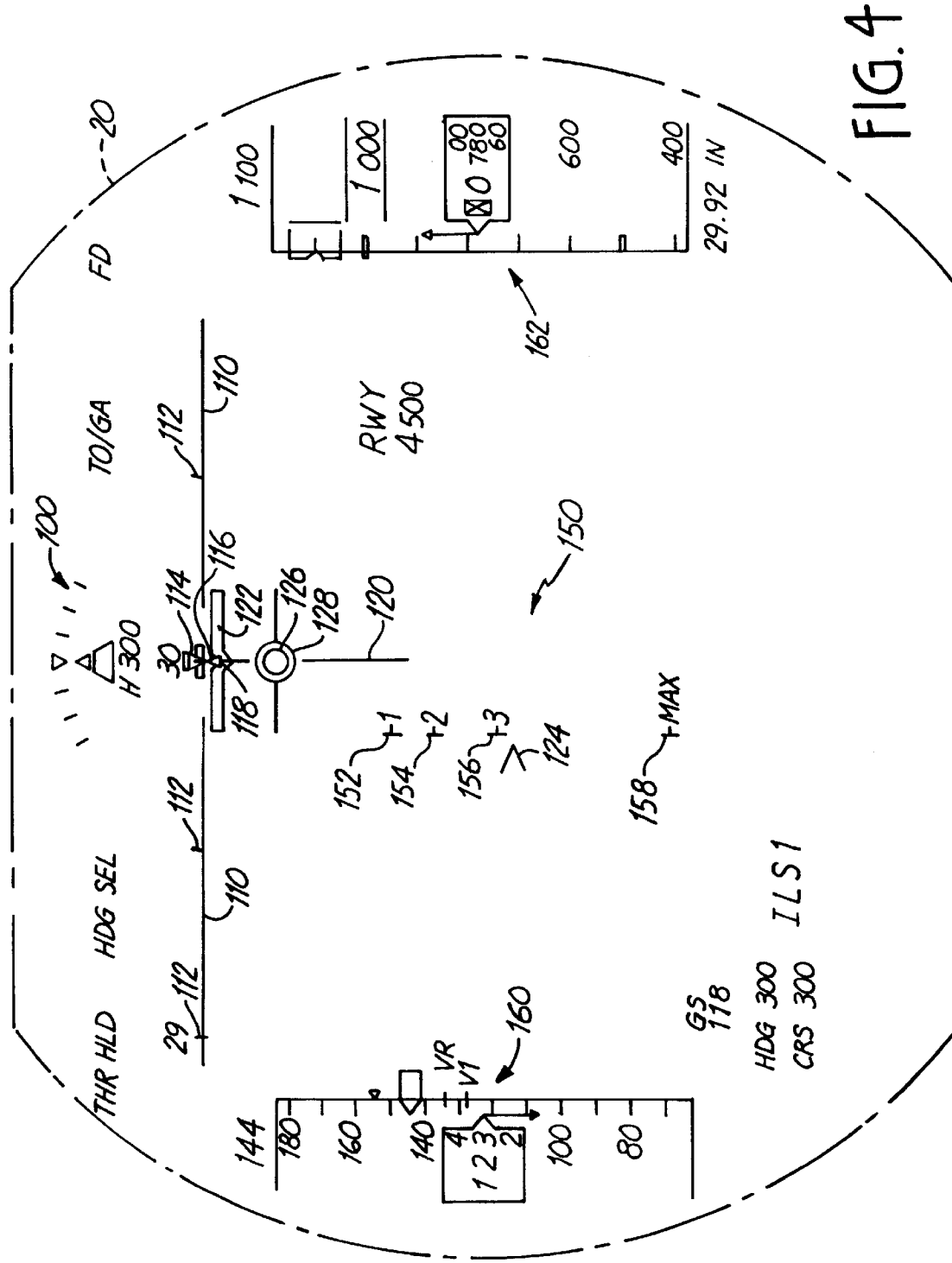
FIG. 4 shows an example of a scene a pilot views on a HUD combiner during a rejected takeoff.

FIGS. 3 and 4 show combiner 20 displaying exemplary aircraft deceleration indications during, respectively, landing rollout and rejected takeoff scenarios. With reference to FIGS. 3 and 4, display symbology presented on combiner 20 includes a roll scale and pointer symbol set 100 positioned above a two-segment horizon line 110 with vertical compass location markers 112. An inverted triangle 114 located in the space between the segments of horizon line 110 represents an aircraft heading index, the value of which is indicated by the digital readout "H 300." A triangle 116 with a vertical line 118 extending down from the middle of the bottom side represents the selected course "dialed in" by the pilot. A vertical line 120 represents lateral deviation from the runway centerline. The reference location for lateral deviations is vertical line 118. An aircraft or "boresight" reference symbol 122 representing the projected longitudinal centerline of the aircraft provides a stationary reference for an aircraft acceleration symbol 124, which moves vertically with reference to boresight reference symbol 122. (The term "aircraft acceleration" indicates situations in which the aircraft moves either in flight or on the ground, or is undergoing positive acceleration or negative acceleration (i.e., deceleration).) The vertical offset of aircraft acceleration symbol 124 below boresight reference symbol 122 shows the actual deceleration of the aircraft as it moves along a runway surface. As the aircraft travels down a runway, the pilot sees on combiner 20 the relative position of a ground roll guidance cue 126 to a ground roll reference symbol 128. The alphanumeric characters "RWY 4500" represent the remaining runway length.

FIG. 3 represents an example of a scene a pilot views on combiner 20 during landing rollout. With particular reference to FIG. 3, a deceleration scale 150 composed of four spaced-apart scale marks 152, 154, 156, and 158 appears on combiner 20 in the form of a linear scale relative to boresight reference symbol 122 upon aircraft touchdown on the runway. Each of the scale marks is in the form of a sideways "T", with a horizontal line marking the exact position of the referenced deceleration level and an attached vertical line that provides a small range indication. The position of aircraft acceleration symbol 124 with respect to scale marks 152, 154, 156, and 158 indicates the actual deceleration of the aircraft with respect to the nominal deceleration levels the scale marks represent. In a preferred embodiment, the distance of each of scale marks 152, 154, 156, and 158 below boresight reference symbol 122 represents the nominal deceleration level provided by a corresponding setting of an automatic autobraking (autobrake) system installed in the aircraft. Scale marks 152, 154, 156, and 158 correspond to the respective autobrake settings 1, 2, 3, and MAX, with which, for example, a Boeing 737-300 aircraft, a pilot would be familiar. The higher value numbers indicate higher autobrake forces, with MAX indicating a maximum autobrake force. FIG. 3 shows aircraft acceleration symbol 124 positioned beside scale mark 154, indicating a total aircraft deceleration at that of autobrake setting 2. The alphanumeric characters "GS 115" represent a ground speed of 115 knots.

During a landing scenario, air/ground logic implemented in an aircraft onboard computer causes the aircraft display system to project deceleration scale 150 upon aircraft touchdown. An aircraft accelerometer produces an output signal that is applied to the onboard computer to drive the position of aircraft acceleration symbol 124.

FIG. 4 presents an example of a scene a pilot views on combiner 20 during a rejected takeoff. The appearance of deceleration scale 150 on combiner 20 and its relationship to the position of aircraft acceleration symbol 124 is the same as that described above with reference to FIG. 3. FIG. 4 shows aircraft acceleration symbol 124 positioned just below scale mark 156, indicating a slightly higher deceleration than that of autobraking setting 3. The alphanumeric characters "GS 118" represent a ground speed of 118 knots. (The scales displayed on the left- and right-hand sides of combiner 20 represent an air speed tape 160 and an altitude tape 162, respectively.)

During a rejected takeoff scenario, an aircraft speed sensor and the accelerometer produce output signals that are applied to the onboard computer system, which causes the aircraft display system to project deceleration scale 150 whenever the ground speed exceeds 50 knots and there is negative acceleration.

When an autobrake system is in use, deceleration scale 150 allows the pilot to monitor the operation of the autobrake system. If aircraft acceleration symbol 124 is close to the scale mark corresponding to the selected autobrake setting, the autobrake system is performing nominally. If aircraft acceleration symbol 124 is far above the scale mark corresponding to the selected autobrake setting, the autobrake system has not achieved the desired aircraft deceleration level, and additional pilot action may be required. When manual braking is in use, deceleration scale 150 allows the pilot to modulate the brake application and/or reverse thrust power level to control the deceleration to a known level.

During landing rollout, the pilot can ensure that a sufficient deceleration level is achieved so that the aircraft slows to taxi speed in sufficient time to make a taxiway turnoff. This information is especially useful at night and in reduced visibility conditions.

It will be obvious to those having skill in the art that many changes may be made to the details of the above-described embodiment of this invention without departing from the underlying principles thereof. For example, the deceleration symbology can be presented advantageously on head-down display systems. The scope of the present invention should, therefore, be determined only by the following claims.

What is claimied is:

1. In an aircraft optical display system that produces images for observation by a pilot, the display system including an image source providing an image carried by light propagating along an optical path and an optical display surface positioned so as to provide an image for observation by the pilot, a method of providing for display on the display surface quantitative aircraft deceleration information symbology that alerts the pilot to, and thereby prevents delayed pilot recognition of, possible inadequate deceleration of an aircraft as it moves on the ground, comprising:

displaying reference symbology;

displaying aircraft acceleration symbology that changes position on the display surface to indicate corresponding changes in actual longitudinal acceleration or deceleration of an aircraft as it moves on the ground, the changing position of the aircraft acceleration symbology causing a corresponding change in a display offset distance between the reference symbology and the aircraft acceleration symbology, the change in display offset distance representing a relative change in acceleration or deceleration of the aircraft; and presenting an aircraft deceleration display scale on the display surface to provide a reference for display of quantitative deceleration information for the pilot to interpret the actual deceleration of the aircraft.

2. The method of claim 1 in which the reference symbology is a boresight reference symbol.

3. The method of claim 1 in which the deceleration display scale includes marks that provide known reference points of deceleration information.

4. The method of claim 3 in which the position of the aircraft acceleration symbology relative to the marks on the display scale indicates the actual deceleration of the aircraft with respect to the reference provided by the display scale.

5. The method of claim 1 in which the offset distance between the reference symbology and the aircraft acceleration symbology indicates the actual deceleration of the aircraft by positioning the aircraft acceleration symbology below the reference symbology on the display surface, with increasing deceleration of the aircraft indicated by positioning the aircraft acceleration symbology larger distances below the reference symbology.

6. The method of claim 5 in which the deceleration display scale includes spaced-apart marks, each of which having a distance below the reference symbology, and each distance representing a nominal deceleration level provided by a corresponding setting of an automatic aircraft braking system, so that the position of the aircraft acceleration symbology with respect to the marks of the display scale indicates the actual deceleration of the aircraft with respect to nominal deceleration levels of the automatic aircraft braking system.

7. The method of claim 5 in which the aircraft acceleration symbology moves along a display surface path and in which the deceleration display scale includes spaced-apart marks that are displayed proximal to and along the display surface path of the aircraft acceleration symbology.

8. The method of claim 1 in which the aircraft deceleration display scale is displayed during either a landing rollout or rejected takeoff of the aircraft.

9. The method of claim 1 in which the optical display system produces images for observation in combination with the pilot's exterior view of an outside world scene, and in which the optical display surface comprises an optical combiner so that the pilot can see the exterior view through it and so that at least some of the light reflects off of the combiner to provide the image for observation by the pilot.

* * * * *